(12) United States Patent
Feng et al.

(10) Patent No.: US 12,550,871 B2
(45) Date of Patent: Feb. 17, 2026

(54) PET COMPANION DEVICE, HANDHELD DEVICE, TERMINAL DEVICE AND SYSTEM

(71) Applicants: Wenjin Feng, Shenzhen (CN); Junyong Zhang, Shenzhen (CN)

(72) Inventors: Wenjin Feng, Shenzhen (CN); Junyong Zhang, Shenzhen (CN)

( * ) Notice: Subject to any disclaimer, the term of this patent is extended or adjusted under 35 U.S.C. 154(b) by 0 days.

(21) Appl. No.: 19/031,460

(22) Filed: Jan. 18, 2025

(65) Prior Publication Data
US 2025/0169476 A1  May 29, 2025

Related U.S. Application Data

(63) Continuation of application No. PCT/CN2024/133058, filed on Nov. 19, 2024.

(51) Int. Cl.
*A01K 29/00* (2006.01)
*A01K 15/02* (2006.01)

(52) U.S. Cl.
CPC .......... *A01K 29/005* (2013.01); *A01K 15/021* (2013.01); *A01K 15/0257* (2025.08)

(58) Field of Classification Search
None
See application file for complete search history.

(56) References Cited

U.S. PATENT DOCUMENTS

| | | | |
|---|---|---|---|
| 4,391,224 A * | 7/1983 | Adler | A63H 13/02 446/458 |
| 4,687,918 A * | 8/1987 | Hughes | H01S 3/0007 219/121.61 |
| 5,334,075 A * | 8/1994 | Kakizaki | A63H 30/04 446/438 |
| 10,362,764 B2 * | 7/2019 | Rosenberg | A01K 15/025 |
| 10,893,661 B2 * | 1/2021 | Tarantino | A01K 27/009 |
| 12,264,792 B2 * | 4/2025 | Schipke | F21V 23/0414 |
| 2014/0261230 A1 * | 9/2014 | Davison, III | A01K 15/025 119/707 |
| 2017/0042121 A1 * | 2/2017 | Jersa, III | A01K 5/02 |
| 2020/0221668 A1 * | 7/2020 | Suh | B25J 11/008 |
| 2022/0053736 A1 * | 2/2022 | Xiao | A01K 15/021 |
| 2022/0361456 A1 * | 11/2022 | Zhang | A01K 29/005 |
| 2022/0394955 A1 * | 12/2022 | Van Curen | A01K 15/023 |

FOREIGN PATENT DOCUMENTS

| | | | | |
|---|---|---|---|---|
| CN | 111870227 A | * | 11/2020 | A01K 15/025 |
| KR | 20240000978 U | * | 6/2024 | G02B 27/20 |

* cited by examiner

Primary Examiner — Magdalena Topolski
(74) Attorney, Agent, or Firm — Nitin Kaushik

(57) ABSTRACT

A pet companion device, a handheld device, a terminal device and a system, wherein the pet companion device comprises a pet companion handheld module and a pet companion terminal module; the pet companion terminal module is arranged on the neck of the pet and is configured to receive first positioning information sent by the pet companion handheld module and return first positioning response information, the first positioning response information comprises the first position of the pet companion terminal module; the pet companion handheld module is arranged in a mobile device and is configured to directionally send out sound information and/or image information according to the first positioning response information of the pet companion terminal module to attract the attention of the pet.

8 Claims, 5 Drawing Sheets

PET COMPANION DEVICE, HANDHELD DEVICE, TERMINAL DEVICE AND SYSTEM

CROSS-REFERENCE TO RELATED APPLICATIONS

This application is a national application of PCT/CN2024/133058, filed on Nov. 19, 2024. The contents of PCT/CN2024/133058 are all hereby incorporated by reference.

TECHNICAL FIELD

The present disclosure relates to the technical field of pets, and in particular, relates to a pet companion device, a handheld device, a terminal device and a system.

BACKGROUND

With the progress of society and the improvement of living standards, many pet cat owners pay more and more attention to their pet cats. In addition to daily feeding and companionship, they also want to further manage the health of their pet cats, so as to prolong the lives of the pet cats as much as possible and improve their quality of life. At present, in many cities, there is little room for pet cats, and some species of pet cats do not like exercise per se, which makes some pet cats prone to obesity, illness, weakness and other problems.

Furthermore, with the acceleration of the pace of daily life for humans, the time and energy for pet owners to play with their pet cats are getting less and less.

Therefore, there is an urgent need for an intelligent device that can be operated conveniently and save the exercise intensity of the pet owners, so that pet cat owners can control and guide their pet cats to exercise and play more conveniently, thereby increasing the exercise amount of the pet cats and improving their health level.

SUMMARY

The present disclosure provides a pet companion device, a handheld device, a terminal device and a system, which can conveniently control pet cats to exercise and play in real time, so as to solve the above problems.

In one aspect, the present disclosure provides a pet companion device which comprises a pet companion handheld module and a pet companion terminal module; the pet companion terminal module is arranged on the neck of the pet and is configured to receive first positioning information sent by the pet companion handheld module and return first positioning response information, wherein the first positioning response information comprises the first position of the pet companion terminal module; the pet companion handheld module is arranged in a mobile device and is configured to directionally send out sound information and/or image information according to the first positioning response information of the pet companion terminal module to attract the attention of the pet.

In some embodiments, the pet companion handheld module is further configured to directionally send out light information including infrared rays according to the first position of the pet companion terminal module.

In some embodiments, the pet companion handheld module is further configured to directionally send out one or more of the following information according to an input control instruction received by the mobile device: sound information, image information, light information and vibration information.

In some embodiments, the input control instruction comprises a mechanical key input.

In some embodiments, the input control instruction comprises a voice input.

In some embodiments, the input control instruction comprises a vibration input.

In another aspect, the present disclosure further provides a pet companion handheld device, which comprises:
a first bottom shell;
a first face shell, being buckled with the first bottom shell to form a first accommodating cavity;
a first control circuit board, being arranged in the first accommodating cavity;
a light and shadow output device, being arranged in the first accommodating cavity and electrically connected with the first control circuit board, and being configured to output light and shadow or light spots that attract the attention of the pet;
a plurality of keys, being respectively arranged on the first bottom shell and/or the first face shell and electrically connected with the first control circuit board, and being configured to control the first control circuit board to generate required control signals.

In some embodiments, the light and shadow output device comprises a laser generator capable of generating infrared laser.

In some embodiments, the pet companion handheld device further comprises a first graphic display module, and the first graphic display module comprises:
a lamp strip, being accommodated in the first accommodating cavity and electrically connected with the first control circuit board;
a light shielding plate, being covered on the lamp strip;
a sticker, being arranged between the light shielding plate and the first face shell;
the first face shell is opened with a first through hole at a position corresponding to the sticker, the size and shape of the first through hole correspond to the sticker, a first groove is arranged around the first through hole, and a first lens capable of transmitting light is accommodated in the first groove.

In some embodiments, the pet companion handheld device further comprises a vibration gear adjusting assembly, and the vibration gear adjusting assembly comprises:
a knob plate, being accommodated in the first accommodating cavity and electrically connected with the first control circuit board;
an encoder, being accommodated in the first accommodating cavity, one end of the encoder being electrically connected with the knob plate, and the other end extending out of the first accommodating cavity;
a knob cap, being covered on the end of the encoder extending out of the first accommodating cavity.

In some embodiments, the pet companion handheld device further comprises a first battery and a first charging interface, wherein the first battery is accommodated in the first accommodating cavity and electrically connected with the first control circuit board, the first charging interface is electrically connected with the first control circuit board, and a first charging through hole corresponding to the first charging interface is opened on the first bottom shell.

In some embodiments, the first control circuit board comprises a singlechip, a charging module, a display module and a first wireless communication module;

the singlechip is electrically connected with the charging module, the display module and the first wireless communication module respectively;

the charging module is configured to charge the first battery;

the display module is configured to control the display content of the first graphic display module; and the first wireless communication module is configured to perform wireless communication with an external terminal device.

In some embodiments, the keys include a light and shadow control key that is connected with a light and shadow control input pin of the singlechip, and a light and shadow control output pin of the singlechip is connected with the light and shadow output device to control the light and shadow output device to emit light and shadow.

In some embodiments, the key comprises a sound control key, and the sound control key is connected with a buzzer control pin of the singlechip and is configured to input a sound control signal to the external terminal device through the first wireless communication module to control the external terminal device to emit a sound.

In some embodiments, the key comprises a vibration control key, and the vibration control key is connected with a motor control pin of the singlechip and is configured to input a vibration control signal to the external terminal device through the first wireless communication module to control the external terminal device to generate vibration.

In yet another aspect, the present disclosure further provides a pet companion terminal device, which comprises:

a second bottom shell;

a second face shell, being buckled with the second bottom shell to form a second accommodating cavity;

a second control circuit board, being arranged in the second accommodating cavity;

a vibration motor, being arranged in the second accommodating cavity and electrically connected with the second control circuit board, and being configured to generate vibration that attracts the attention of the pet;

a loudspeaker, being arranged in the second accommodating cavity and electrically connected with the second control circuit board, and being configured to generate sounds that attract the attention of animals.

In some embodiments, the pet companion terminal device further comprises a second graphic display module, the second graphic display module is arranged in the second accommodating cavity and is configured to display the working state of the pet companion terminal device, the second face shell is provided with a second through hole at a position corresponding to the second graphic display module, the size and shape of the second through hole correspond to the second graphic display module, a second groove is arranged around the second through hole, and a second lens capable of transmitting light is accommodated in the second groove.

In some embodiments, the pet companion terminal device further comprises a second battery and a second charging interface, wherein the second battery is accommodated in the second accommodating cavity and is electrically connected with the second control circuit board, the second charging interface is electrically connected with the second control circuit board, and a second charging through hole corresponding to the second charging interface is opened on the second bottom shell.

In some embodiments, the pet companion terminal device further comprises a dustproof plug for closing the second charging interface, and the dustproof plug is inserted into the second charging through hole.

In a further aspect, the present disclosure further provides a pet companion system, which comprises the pet companion handheld device as described above and the pet companion terminal device as described above.

The present disclosure has the following beneficial effects: the pet companion device according to the present disclosure comprises a pet companion handheld module and a pet companion terminal module; the pet companion terminal module is arranged on the neck of the pet and is configured to receive first positioning information sent by the pet companion handheld module and return first positioning response information, the first positioning response information comprises the first position of the pet companion terminal module; the pet companion handheld module is arranged in a mobile device and is configured to directionally send out sound information and/or image information according to the first positioning response information of the pet companion terminal module to attract the attention of the pet. With the solution of the present disclosure, users (such as pet owners, breeders, etc.) can control and guide their pets to exercise and play simply by controlling the terminal in their hands without running back and forth or doing other high-intensity sports or using other large-scale equipment, thereby improving the exercise training effect of pets.

DETAILED DESCRIPTION

Hereinafter, solutions of embodiments of the present disclosure will be described in detail with reference to the attached drawings of the specification.

In the following description, for the purpose of explanation rather than limitation, specific details such as specific system architectures, interfaces and technologies are set forth in order to thoroughly understand the present disclosure.

Herein, the term "and/or" is only used to describe association relationships among associated objects, and it means that there may be three kinds of relationships among the associated objects. For example, A and/or B may represent the following three cases: A alone, both A and B, and B alone. In addition, the character "/" used herein generally indicates that the associated objects before and after the character "/" are in an "or" relationship. In addition, "multiple" used herein means two or more. Additionally, the term "at least one" used herein means any one or any combination of at least two of multiple items. For example, at least one of A, B and C being included may mean that any one or more elements selected from the set of A, B and C is included.

Figure 1:
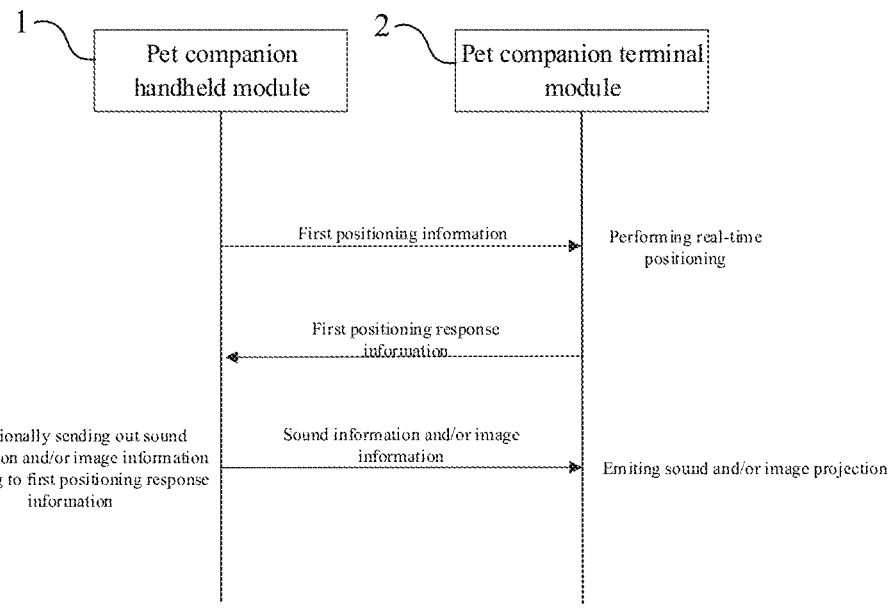
FIG. 1 is a schematic view illustrating the principle of an embodiment of a pet companion device provided according to the present disclosure.

Referring to FIG. 1, there is shown a schematic view of an embodiment of a pet companion device provided according to the present disclosure. As shown in FIG. 1, in one aspect, the present disclosure provides a pet companion device which comprises a pet companion handheld module 1 and a pet companion terminal module 2; the pet companion terminal module 2 is arranged on the neck of the pet and is configured to receive first positioning information sent by the pet companion handheld module 1 and return first positioning response information; the pet companion handheld module 1 is arranged in a mobile device and is configured to directionally send out sound information and/or image information according to the first positioning response information of the pet companion terminal module 2 to attract the attention of the pet.

The first positioning information is positioning request information sent by the pet companion handheld module 1 to the pet companion terminal module 2 in order to receive the location information of the current location of the pet companion terminal module 2. The first positioning response information is the position information of the current position of the pet companion terminal module 2 obtained by the pet companion terminal module 2 through recognizing and processing the received first positioning information sent by the pet companion handheld module 1, and the first positioning response information comprises the first position where the pet companion terminal module 2 is currently located.

Specifically, after the user sends out the first positioning information by using the pet companion handheld module 1 in the mobile device, the pet companion terminal module 2 receives the first positioning information and performs real-time positioning, and returns the first positioning response information including the first position of the pet companion terminal module 2 to the pet companion handheld module 1; then, the pet companion handheld module 1 directionally sends out sound information and/or image information to the pet companion terminal module 2 according to the first positioning response information, so that the pet companion terminal module 2 correspondingly emits sound and/or image projection that can be recognized by the pet, so as to attract the attention of the pet and urge the pet to exercise.

It shall be noted that, the sound information is the control information that is used to control the pet companion terminal module 2 to send out information that can be recognized by the pet. The sounds emitted by the pet companion terminal module 2 that can be recognized by the pet cat include sounds that can stimulate the pet cat, such as sounds of cats, mice and dogs. The image information is the control information that is used to control the pet companion terminal module 2 to send out image projection that can be recognized by the pet cat. The image projection sent out by the pet companion terminal module 2 that can be recognized by the pet cat include image projection such as animal animation and pictures that can attract the attention of the pet cat.

In some other embodiments, the pet companion handheld module 1 can directionally send out image projection directly according to the first position of the pet companion terminal module 2, and the user can change the position of the image projection continuously by changing the position of the mobile device so as to attract the attention of other pets and urge them to exercise.

After the pet companion handheld module 1 acquires the first position of the pet companion terminal module 2, the pet companion handheld module 1 is further configured to directionally send out light information according to the first position of the pet companion terminal module 2.

It shall be noted that the lighting information is a light source directly emitted by the pet companion handheld module 1, and the lighting information includes infrared light and light sources of other colors. After the pet companion handheld module 1 emits the light source, the user constantly changes the projection position corresponding to the light source by changing the position of the mobile device, so as to attract the attention of the pet cat, control and guide the pet cat to exercise and play, thereby improving the exercise training effect of the pet cat.

The pet companion handheld module 1 is further configured to directionally send out one or more of the following information according to the input control instruction received by the mobile device: sound information, image information, lighting information, vibration information and other information.

It shall be noted that, like the sound information and the image information, the vibration information is also control information for controlling the pet companion terminal module 2, and specifically, it is the control information for controlling the pet companion terminal module 2 to emit vibration that can be recognized by the pet. The vibration information includes vibration information of different levels so as to control the pet companion terminal module 2 to generate different levels of vibration, thereby stimulating the pet cat to move.

The input control instruction includes mechanical key input, and the pet companion handheld module 1 on the mobile device is provided with a plurality of mechanical keys, including sound control keys, image control keys, light control keys and vibration control keys or the like. Through the corresponding mechanical key input, the pet companion handheld module 1 controls the pet companion terminal module 2 and/or the pet companion handheld module 1 to execute the function corresponding to the mechanical keys.

Specifically, when the user clicks the sound control key, the pet companion handheld module 1 directionally sends out corresponding sound information to the pet companion terminal module 2, so that the pet companion terminal module 2 emits sounds of cats, mice and dogs to attract the attention of the pet cat and stimulate the pet cat to move. When the user clicks the image control key, the pet companion handheld module 1 directionally sends out corresponding image information to the pet companion terminal module 2, so that the pet companion terminal module 2 projects images such as animal animations and pictures onto the ground for the pet cat to chase, thereby increasing the movement and interest of the pet cat. When the user clicks the light control key, the pet companion handheld module 1 directionally emits the corresponding light source for projection, and the movement and interest of the pet cat are increased when the user controls the pet companion handheld module 1 to project the light source around for the pet cat to chase. When the user clicks the vibration control key, the pet companion handheld module 1 directionally sends out corresponding vibration information to the pet companion terminal module 2, so that the pet companion terminal module 2 vibrates to stimulate the pet cat to move.

The input control instruction further includes voice input, and the pet companion handheld module 1 on the corresponding mobile device is provided with a voice recognition module. By recognizing the corresponding voice command, the pet companion terminal module 2 and/or the pet companion handheld module 1 are controlled to execute the functions corresponding to the voice command. There are many kinds of voice commands, and the functions of the respective voice commands correspond to the functions of the aforesaid plurality of mechanical keys one by one, so that the pet companion handheld module 1 can realize different functions by recognizing different voice commands, thereby increasing the movement amount of the pet cat.

The input control instruction further includes vibration input, and the pet companion handheld module 1 on the corresponding mobile device is provided with a vibration sensing module. By using rhythmic vibration, complex command sequences are transmitted with different combinations of vibration intensities and intervals. Specifically, corresponding vibration commands can be input by clicking on the mobile device for different number of times and with different intensities, so that the pet companion handheld module 1 can perform corresponding functions. There are many kinds of vibration commands, and the respective vibration commands correspond to the functions of the aforesaid plurality of mechanical keys/voice commands one by one, so that the pet companion handheld module 1 can realize different functions by recognizing different vibration commands, thereby increasing the movement amount of the pet cat.

Figure 2:
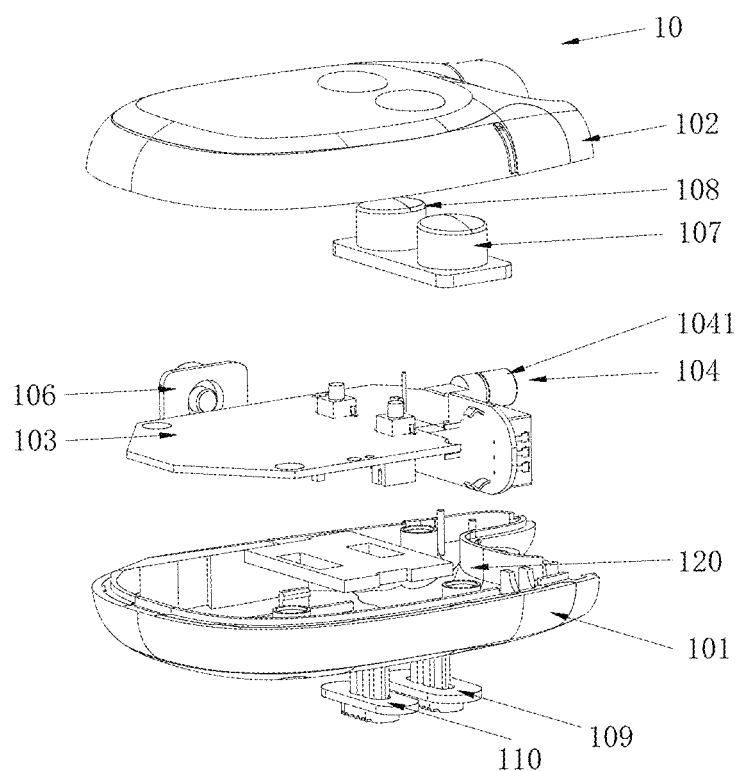
FIG. 2 is a schematic exploded diagram of an embodiment of a pet companion handheld device provided according to the present disclosure.

In another aspect, referring to FIG. 2, the present disclosure provides a pet companion handheld device 10, which includes a first bottom shell 101, a first face shell 102, a first control circuit board 103, a light and shadow output device 104 and a plurality of keys (106 to 110). The first bottom shell 101 and the first face shell 102 are buckled with each other to form a first accommodating cavity 120, the first control circuit board 103 is arranged in the first accommodating cavity 120, and the light and shadow output device 104 is arranged in the first accommodating cavity 120 and is electrically connected with the first control circuit board 120 for outputting light and shadow or light spots that attract the attention of pets. A light and shadow control key 106 is arranged on the side of the first bottom shell 101 and it is configured to control the first control circuit board 103 to generate a signal for controlling the light and shadow output device 104 to perform actions. After receiving the control signal, the light and shadow output device 104 will output preset light spots or images to attract the attention of pets, thereby guiding the pets to move, increasing the movement amount and improving the health level of the pets.

The first face shell 102 is provided with a status indicator lamp 105 penetrating therethrough to indicate the working status of the pet companion handheld device 10. When the status indicator lamp 105 emits green light, it indicates that the pet companion handheld device 10 is in a working state. When the status indicator lamp 105 emits red light, it indicates that the pet companion handheld device 10 is in a dormant state. The first face shell 102 is further provided with a sound control key 107, and the sound control key 107 is electrically connected with the first control circuit board 103 and is used for controlling the first control circuit board 103 to generate a signal for controlling sound. The first face shell 102 is also provided with a vibration control key 108, and the vibration control key 108 is electrically connected with the first control circuit board 103 and is used for controlling the first control circuit board 103 to generate a signal for controlling vibration. Various control signals generated by the first control circuit board 103 are sent to the external terminal device through wireless communication to control the external terminal device to perform corresponding operations. The first bottom shell 101 is provided with a first power switch 109, which is electrically connected with the first control circuit board 103. When the pet companion handheld device 10 is not used, the power supply can be turned off to reduce the power consumption of the device. The first bottom shell 101 is further provided with a terminal switching key 110 for selecting an external terminal device to be controlled.

The terminal switching key 110 corresponds to a plurality of contacts, and by pushing the terminal switching key 110 to different contacts, it is possible to control a plurality of external terminal devices separately or simultaneously, so as to interact with a plurality of pets.

The light and shadow output device 104 includes a laser generator 1041 capable of generating infrared laser. The infrared laser generated by the laser generator 1041 can arouse the interest of the pet cat, so as to guide the pet cat to move and increase the movement amount of the pet cat, thereby improving the health level of the pet cat.

The light and shadow output device 104 may also include other devices, such as LED lights and a light-shielding cover with patterns, which can project to correspondingly output specific images and light and shadow to attract the attention of pet cats.

Figure 3:
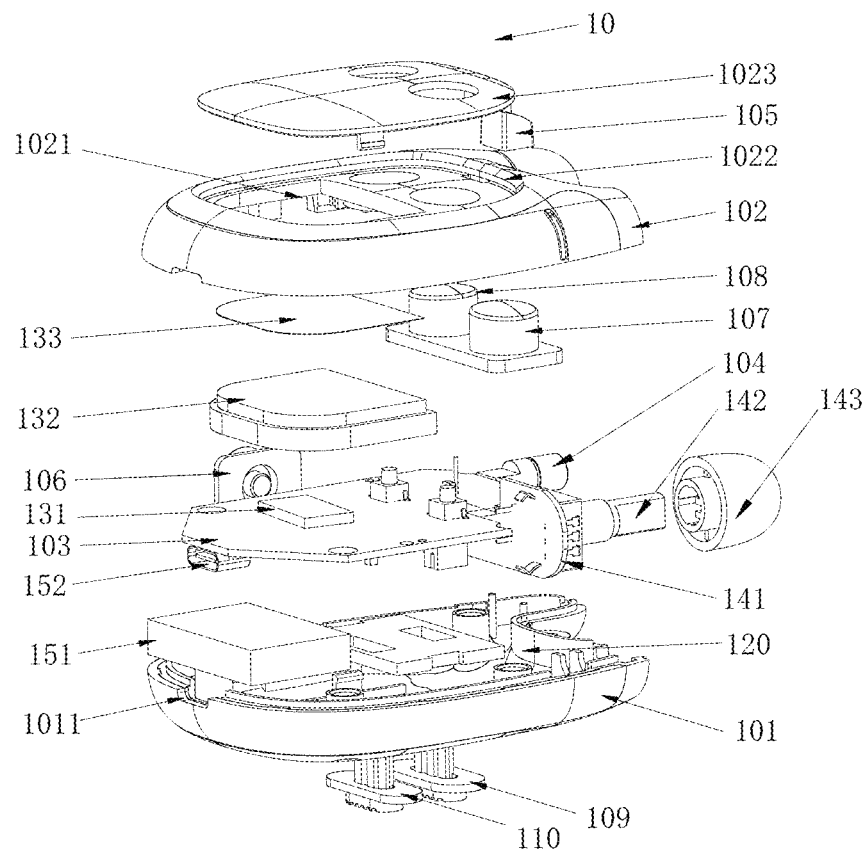
FIG. 3 is another schematic exploded diagram of an embodiment of the pet companion handheld device provided according to the present disclosure.

As shown in FIG. 3, the pet companion handheld device 10 further includes a first graphic display module including a light strip 131, a light shielding plate 132 and a sticker 133. The light strip 131 is accommodated in the first accommodating cavity 120 and electrically connected with the first control circuit board 103. The light shielding plate 132 covers the light strip 131. The sticker 133 is arranged between the light shielding plate 132 and the first face shell 102. The first face shell 102 is provided with a first through hole 1021 at the position corresponding to the sticker 133, and the size and shape of the first through hole 1021 correspond to those of the sticker 133. A first groove 1022 is arranged around the first through hole 1021, and a first lens 1023 capable of transmitting light is accommodated in the first groove 1022. Due to the supplementary lighting function of the light shielding plate 132, the light emitted from different areas of the light strip 131 transmits through the corresponding areas of the sticker 133 to display the working state of the pet companion handheld device 10, such as the electric quantity of the power supply and operation modes or the like, which is convenient for users to operate. The first lens 1023 is used to close the first through hole 1021, thereby realizing the purpose of being attractive, dustproof and waterproof.

As shown in FIG. 3, the pet companion handheld device 10 further includes a vibration gear adjustment assembly which comprises a knob plate 141, an encoder 142 and a knob cap 143. The knob plate 141 is accommodated in the first accommodating cavity 120 and electrically connected with the first control circuit board 103. The encoder 142 is accommodated in the first accommodating cavity 120, and one end of the encoder 142 is electrically connected with the knob plate 141, while the other end of the encoder 142 extends out of the first accommodating cavity 120. The knob cap 143 covers the end of the encoder 142 that extends out of the first accommodating cavity 120. By rotating the knob cap 143, the encoder 142 is driven to rotate so that the first control circuit board 103 generates different vibration control signals. In this way, the external terminal device performs different modes of vibration actions, so as to generate different stimuli for pets and guide the pets to do different behaviors.

As shown in FIG. 3, the pet companion handheld device 10 further includes a first battery 151 and a first charging interface 152. The first battery 151 is accommodated in the first accommodating cavity 120 and electrically connected with the second control circuit board 103. The first charging interface 152 is electrically connected with the first control circuit board 103, and the first bottom shell 101 is opened with a through hole 1011 corresponding to the first charging interface 152. The pet companion handheld device 10 of the present disclosure has a rechargeable first battery 151 built therein which is convenient to carry and use, so it is durable and environmentally friendly without frequent battery replacement.

Figure 6:
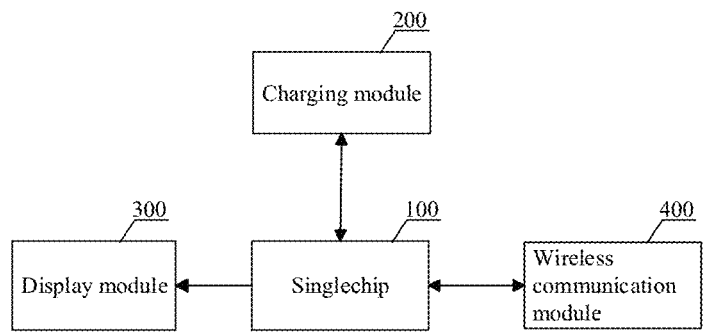
FIG. 6 is a block diagram illustrating the constitution of a first control circuit board in an embodiment of the pet companion handheld device provided according to the present disclosure.

As shown in FIG. 6, the first control circuit board 103 includes a singlechip 100, a charging module 200, a display module 300 and a first wireless communication module 400, wherein the singlechip 100 is electrically connected with the charging module 200, the display module 300 and the first wireless communication module 400 respectively; the charging module is used for charging the first battery 151; the display module 200 is used for controlling the display content of the first graphic display module; and the first wireless communication module 400 is used for receiving or transmitting control signals and performing wireless communication with the external terminal device.

Figure 7:
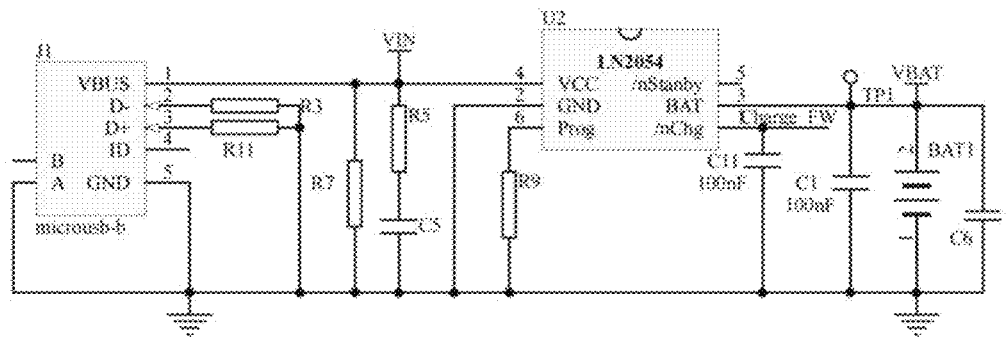
FIG. 7 is a schematic circuit diagram of a charging module in an embodiment of the pet companion handheld device provided according to the present disclosure.

With reference to FIG. 6 and FIG. 7, a first battery BAT1 is connected to the charging module 200, and the charging module 200 includes a chip LN2054. The chip LN2054 includes a voltage input pin VCC, a charging current output pin BAT, a drain open-circuit charging state output pin nChg and a charging current programming pin Prog.

It shall be noted that, the charging current output pin BAT is used to provide charging current for the battery and control the floating voltage to finally reach 4.2V. During charging, the drain open-circuit charging state output pin nChg is placed at a low potential by a built-in N-channel MOSFET; and when the charging is completed, a pull-down current of about 20 µA appears at the drain open-circuit charging state output pin nChg, which indicates the appearance of direct current. The charging current programming pin Prog is used to monitor and turn off the charging current, and the charging current is controlled by a resistor with 1% precision that is grounded. In the state of constant charging current, this port provides a voltage of 1V. In all states, this port voltage can be used to calculate the charging current by the following formula: $I_{BAT}=(V_{Prog}/R_{Prog})1000$. The charging current programming pin Prog may also be used to turn off the charger and separate the programming resistor from the ground terminal, the voltage of the charging current programming pin Prog can be boosted by a pull-up current source of 3 µA, and when the limit shutdown voltage value of 1.21V is reached, the charger stops working, the charging is finished and the input current is reduced to 2 µA. The pinch-off voltage of the charging current programming pin Prog is about 2.4V. When a voltage exceeding the pinch-off voltage is supplied to the charging current programming pin Prog, a high current of 1.5 mA will be obtained, and then the charger will return to a normal state when the charging current programming pin Prog is combined with the ground terminal.

Figure 8:
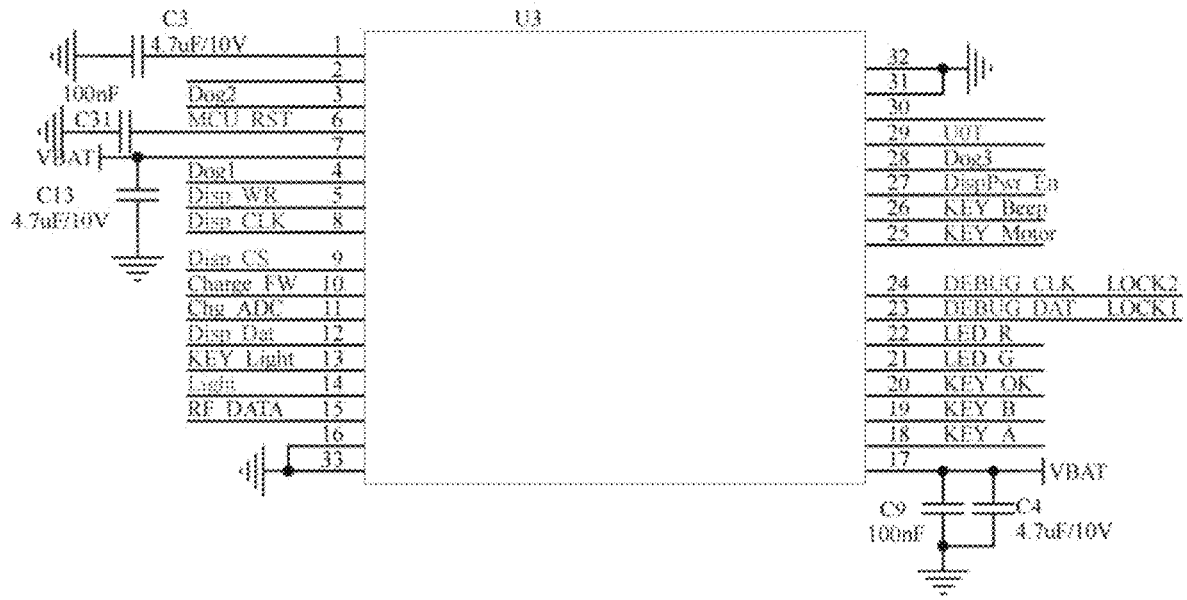
FIG. 8 is a schematic circuit diagram of a singlechip in an embodiment of the pet companion handheld device provided according to the present disclosure.

As shown in FIG. 7 and FIG. 8, the singlechip is a control chip U3, and the voltage input pin VCC of the chip LN2054 is connected to the external input voltage terminal VIN; the charging current programming pin Prog is connected with a programming resistor R9 and then grounded; the charging current output pin BAT is connected to the first battery BAT1 and then grounded to charge the first battery BAT1, and meanwhile, the charging current output pin BAT is further connected to a first capacitor C1 and then grounded to detect whether the first battery BAT1 is connected properly. The positive terminal of the first battery BAT1 is further connected with the first terminal of a second capacitor C6, and the second terminal of the second capacitor C6 is grounded. The drain open-circuit charging state output pin nChg is connected to the second capacitor C11 and then grounded, and the drain open-circuit charging state output pin nChg is further connected to the charging state input pin 10 of the control chip U3.

Figure 9:
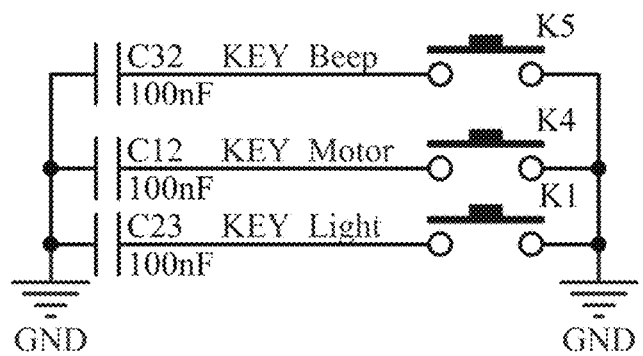
FIG. 9 is a schematic circuit diagram of a plurality of keys in an embodiment of the pet companion handheld device provided according to the present disclosure.

As shown in FIG. 7 to FIG. 9, the seventh pin 7 and the seventeenth pin 17 of the control chip U3 are both connected to the positive terminal of the first battery BAT1; a reset pin 6 is connected to a reset capacitor C31 and then grounded; a buzzer control pin 26 is connected with a sound control key K5 for controlling the external terminal device to emit sound; a motor control pin 25 is connected with a vibration control key K4 for controlling the external terminal device to generate vibration; a light and shadow control input pin 13 is connected with a light and shadow control key K1, and a light and shadow control output pin 14 is connected with the light and shadow output device 104 in FIG. 3 for controlling the light and shadow output device to output light and shadow. A switch confirmation pin 20 is connected with a switch control key for controlling the switch of the pet companion handheld device 10; the A-state pin 18 and the B-state pin 19 are connected to the terminal switching key 110 in FIG. 3, and they are correspondingly used to control the external terminal devices worn by pets A and B respectively.

It shall be noted that, the sound control key K5, the vibration control key K4, the light and shadow control key K1 and the switch control key herein respectively correspond to the sound control key 107, the vibration control key 108, the light and shadow control key 106 and the first power switch 109 in FIG. 3 one by one, except that the former is specifically identified in the circuit diagram, while the latter is specifically identified in the structural exploded diagram.

First, the switch control key is clicked to turn on the pet companion handheld device 10 currently used by the user. After the terminal switching key 110 is moved to the corresponding contact, the pet companion handheld device 10 is correspondingly enabled to control the external terminal devices worn by the pet A and/or the pet B.

Secondly, when the sound control key K5 is clicked, the control chip U3 obtains a sound control signal, and the sound control signal is input to the external terminal device through the first wireless communication module 400 to control the external terminal device to emit sound. When the vibration control key K4 is clicked, the control chip U3 obtains a vibration control signal, and the vibration control signal is input to the external terminal device through the first wireless communication module 400 to control the external terminal device to generate vibration. When the light and shadow control key K1 is clicked, the control chip U3 obtains a light and shadow control signal, and controls the light and shadow output device 104 in FIG. 3 to output light and shadow through the light and shadow control output pin 14.

In some other embodiments, the terminal switching key 110 is further connected with a plurality of other status pins, and the plurality of other status pins correspondingly control a plurality of other external terminal devices (a plurality of other pets) respectively.

Figure 10:
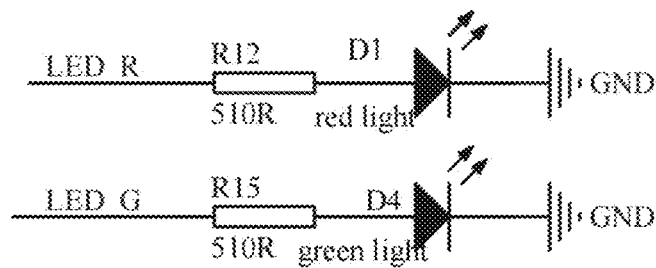
FIG. 10 is a schematic circuit diagram of a status indicator lamp in an embodiment of the pet companion handheld device provided according to the present disclosure.

With reference to FIG. 10, the control chip U3 is further electrically connected to the status indicator lamp 105 in FIG. 3. A red lamp control pin 22 of the control chip U3 is connected to a red lamp resistor R12 and then connected to the positive terminal of a red lamp diode D1, and the negative terminal of the red lamp diode D1 is grounded. A green lamp control pin 21 is connected to a green lamp resistor R15 and then connected to the positive terminal of a green lamp diode D4, and the negative terminal of the green light diode D4 is grounded. By controlling one of the two diodes to be turned on, the working condition of the pet companion handheld device 10 is displayed. If the red lamp diode D1 is turned off and the green lamp diode D4 is turned on, then the status indicator lamp 105 in FIG. 3 emits green light, which indicates that the pet companion handheld device 10 is in a working state. If the red lamp diode D1 is turned on and the green lamp diode D4 is turned off, then the status indicator lamp 105 in FIG. 3 emits red light, which indicates that the pet companion handheld device 10 is in a dormant state.

Figure 11:
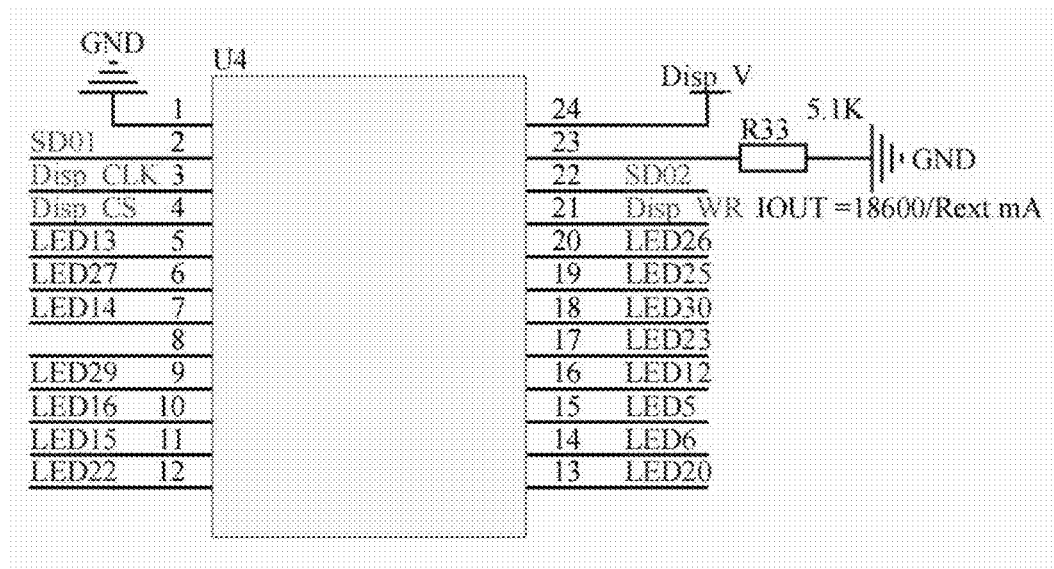
FIG. 11 is a schematic circuit diagram of a first display chip in an embodiment of the pet companion handheld device provided according to the present disclosure.
Figure 12:
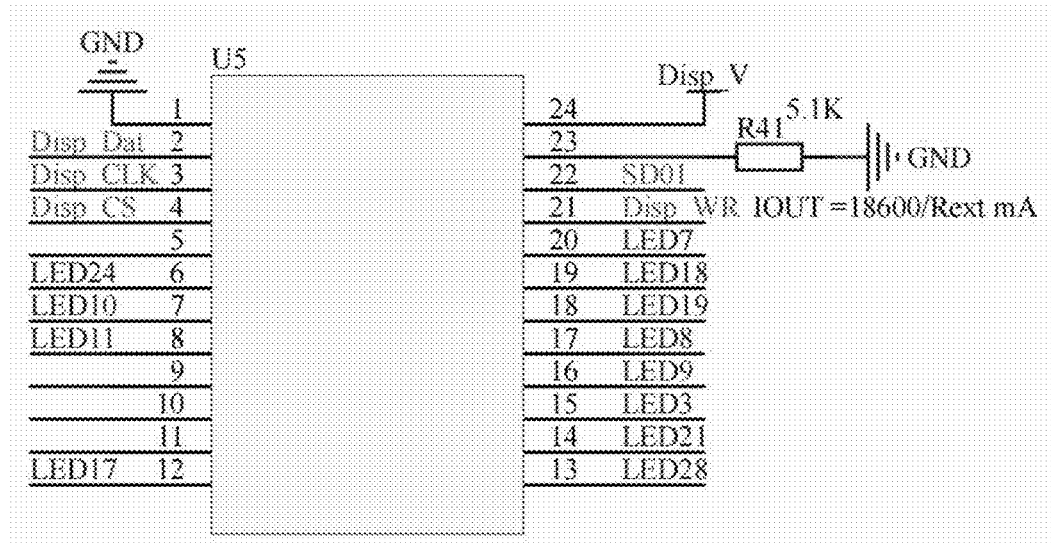
FIG. 12 is a schematic circuit diagram of a second display chip in an embodiment of the pet companion handheld device provided according to the present disclosure.

Referring to FIG. 6, FIG. 11 and FIG. 12 together, the display module 300 includes a first display chip U4, a second display chip U5 and a plurality of light emitting diodes (LED lamps). The first clock pin 8, the first chip selection pin 9 and the first writing pin 5 of the control chip U3 are respectively connected with the second clock pin 3, the second chip selection pin 4 and the second writing pin 21 of the first display chip U4, and meanwhile, the first clock pin 8, the first chip selection pin 9 and the first writing pin 5 of the singlechip are further respectively connected with the third clock pin 3, the third chip selection pin 4 and the third writing pin 21 of the second display chip U5. The first data pin 12 of the control chip U3 is connected to the second data pin 2 of the second display chip U5, the third data pin 22 of the second display chip U5 is connected to the fourth data pin 2 of the first display chip U4, and the first power pin 24 of the first display chip U4 and the second power pin 24 of the second display chip U5 are both connected to the second DC power supply Disp_V. Meanwhile, the light strip 131 in FIG. 3 includes an electric quantity display light strip and a content display light strip composed of a plurality of light emitting diodes, and the electric quantity display light strip corresponds to the display content on the sticker 133 where the electric quantity state is displayed, while the content display light strip corresponds to the display content on the sticker 133 where the working state is displayed.

The negative terminals of all light-emitting diodes in the display module 300 are connected to the corresponding resistors respectively, and then connected to the corresponding light-emitting control pins of the first display chip U4 or the second display chip U5, and the positive terminals of all light-emitting diodes are connected to the second DC power supply Disp_V correspondingly connected to the display module 300.

After the positive terminal of the first battery BAT1 is connected to the switch tube, the second DC power supply Disp_V is controlled to be output through the display power supply enabling pin 27 on the control chip U3.

The conduction of a plurality of light-emitting diodes in the electric quantity display light strip is controlled through the first display chip U4 and the second display chip U5, so that the electric quantity of the pet companion terminal device 10 is displayed. If all the corresponding LEDs of the electric quantity display light strip are turned on, then the corresponding LEDs all emit light, which indicates that the pet companion handheld device 10 is in a fully charged state. If several LEDs are turned off, then the corresponding LEDs do not emit light, which indicates that the pet companion handheld device 10 is in a non-fully charged state. If all the LEDs corresponding to the electric quantity display light strip are turned off, then all the corresponding LEDs do not emit light, which indicates that the pet companion handheld device 10 is in power shortage.

Accordingly, by clicking the corresponding control key on the pet companion handheld device 10, the control chip U3 controls the first display chip U4 and the second display chip U5 to turn on other corresponding light-emitting diodes, thereby displaying the working state of the pet companion handheld device 10 controlling the external terminal device, including whether the external terminal device emits sound, generates vibration or the like.

Figure 13:
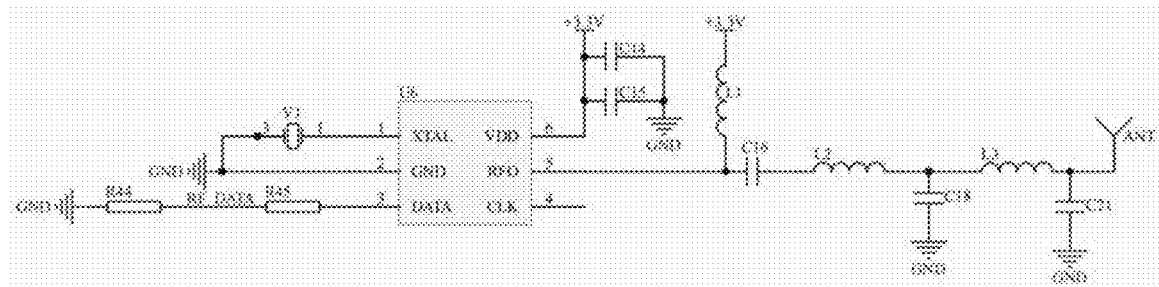
FIG. 13 is a schematic circuit diagram of a first wireless communication module in an embodiment of the pet companion handheld device provided according to the present disclosure.

As shown in FIG. 6, FIG. 8 and FIG. 13, the first wireless communication module 400 includes a communication chip U6, a power pin VDD of the communication chip U6 is connected to the third DC power supply +3.3V, and the third DC power supply +3.3V is connected to the first inductor L1 and then connected to the RF communication pin RFO of the communication chip U6. The electrical connection between the RF communication pin RFO and the first inductor L1 is further connected to the communication capacitor C16, the second inductor L2 and the third inductor L3 in turn, and then connected to the antenna ANT so that signals are received/transmitted via the antenna ANT. The electrical connection between the second inductor L2 and the third inductor L3 is further connected to the first grounded capacitor C18 and then grounded, and the electrical connection between the third inductor L3 and the antenna ANT is further connected to the second grounded capacitor C21 and then grounded. The data input/output terminal DATA of the communication chip U6 is connected to the resistor R45 and then connected to an RF signal input/output terminal 15 of the control chip U3, so as to realize the data communication between the singlechip 100 and the first wireless communication module 400.

Figure 4:
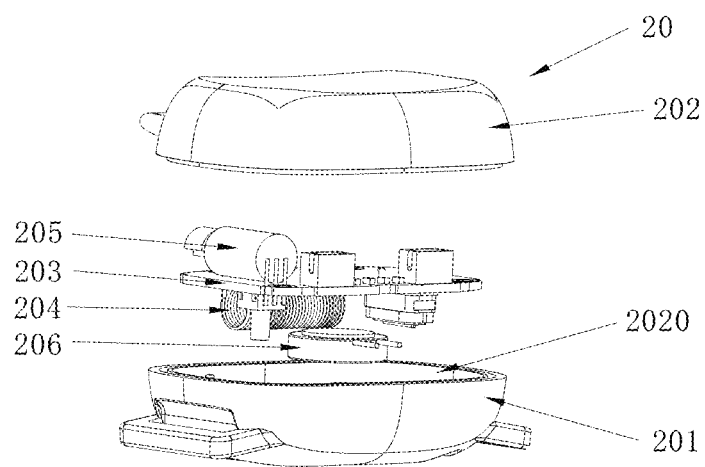
FIG. 4 is a schematic exploded diagram of an embodiment of a pet companion terminal device provided according to the present disclosure.

In a further aspect, referring to FIG. 4, the present disclosure further provides a pet companion terminal device 20, which includes a second bottom shell 201, a second face shell 202, a second control circuit board 203, a vibration motor 205 and a speaker 206. The second bottom shell 201 and the second face shell 202 are buckled together to form a second accommodating cavity 2020, and the second control circuit board 203 is arranged in the second accommodating cavity 2020. The second control circuit board 203 is provided with a second wireless communication module 204 for receiving or transmitting control signals to perform wireless communication with external devices. The vibration motor 205 is disposed in the second accommodating cavity 2020 and electrically connected to the second control circuit board 203. The speaker 206 is disposed in the second accommodating cavity 2020 and electrically connected to the second control circuit board 203.

When the user presses the vibration control key 108 on the pet companion handheld device 10, the pet companion handheld device 10 sends a vibration control signal to the pet companion terminal device 20. After receiving the vibration control signal through the second wireless communication module 204, the second control circuit board 203 controls the vibration motor 205 to generate vibration, thereby attracting the attention of the pet cat and guiding the behavior of the pet cat.

When the user presses the sound control key 107 on the pet companion handheld device 10, the pet companion handheld device 10 sends a sound control signal to the pet companion terminal device 20. After receiving the sound control signal through the second wireless communication module 204, the second control circuit board 203 controls the speaker 206 to play a preset sound, thereby attracting the attention of the pet cat and guiding the behavior of the pet cat.

Figure 5:
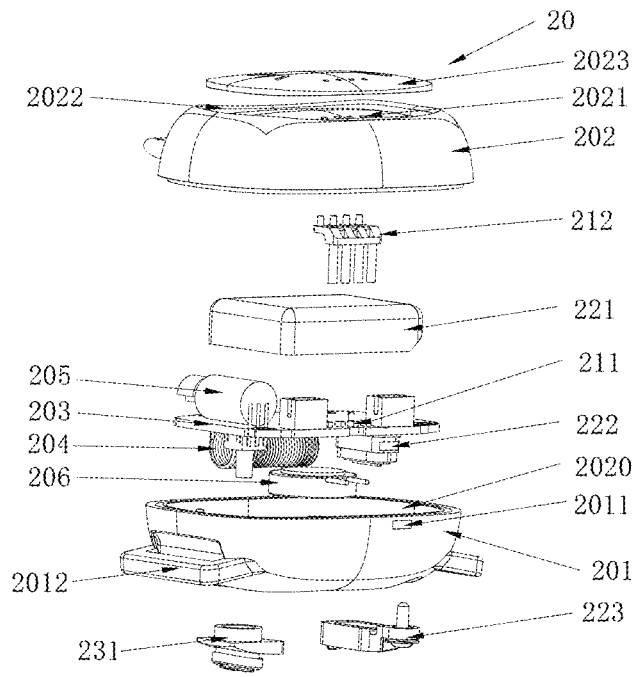
FIG. 5 is another schematic exploded diagram of an embodiment of the pet companion terminal device provided according to the present disclosure.

As shown in FIG. 5, the pet companion terminal device 20 further includes a second graphic display module which comprises a plurality of power indicator lamps 211 and light guiding columns 212. The power indicator lamps 211 are arranged in the second accommodating cavity 2020 and electrically connected with the second control circuit board 203. The light guiding columns 211 are arranged in the second accommodating cavity 2020 and connected with the power indicator lamps 211, so that the light emitted by the power indicator lamps 211 can propagate along the light guiding columns 211. The second face shell 202 is provided with a second through hole 2021 at the position corresponding to the light guiding column 211, and the size and shape of the second through hole 2021 correspond to the light guiding column 211. A second groove 2022 is arranged around the second through hole 2021, and a second lens 2023 capable of transmitting light is accommodated in the second groove 2022. The second lens 2023 is used to close the second through hole 2021, thereby achieving the purpose of being attractive, dustproof and waterproof.

The second graphic display module may further include elements such as a LED display screen to display other states of the pet companion terminal device, such as whether it is vibrating or not, whether it is playing sound or the like.

As shown in FIG. 5, the pet companion terminal device 20 further comprises a second battery 221 and a second charging interface 222. The second battery 221 is accommodated in the second accommodating cavity 222 and electrically connected with the second control circuit board 203. The second charging interface 222 is electrically connected with the second control circuit board 203, and the second bottom shell 201 is opened with a second charging through hole 2011 corresponding to the second charging interface 222. The second control circuit board 203 can change the number of the power indicator lamps 211 which are turned on according to the change of the electric quantity of the second battery 221, which is convenient for the user to judge the power state. In the present disclosure, the second battery 221 is built into the pet companion terminal device 20 so that it is more convenient to carry and use the pet companion terminal device 20, and it is durable and environmentally friendly without frequent battery replacement.

The second charging interface 222 can adopt either a Type-C interface or a Micro USB interface or a Lighting interface.

Furthermore, the pet companion terminal device 20 further includes a dustproof plug 223 for closing the second charging interface 222, and the dustproof plug is inserted into the second charging through hole 2011. In the present disclosure, the dustproof plug 223 can well prevent foreign matters such as dust and water from entering the second charging interface 222, thereby protecting the second charging interface 222.

Further speaking, the second bottom shell 201 is provided with at least one ear hole 2012 for a strap to pass therethrough, so that the pet companion terminal device 20 can be conveniently worn on the neck of the pet cat.

Furthermore, the pet companion terminal device 20 may further include a second power switch key 231 which is arranged on the second bottom shell 201 and electrically connected with the second control circuit board 203, and thus the device can be turned off when it is not used so as to reduce the power consumption of the device.

In yet another aspect, the present disclosure further provides a pet companion system, which includes the pet companion handheld device 10 and the pet companion terminal device 20 described above. By controlling the pet companion handheld device 10 in their hands, the users can control the pet companion terminal device 20 to emit signals such as sound and/or image projection that can be recognized by the pet cat and attract the attention of the pet cat, thereby controlling and guiding the pet cat to exercise and play, and improving the exercise training effect of the pet cat.

The aforesaid pet companion device, handheld device, terminal device and system can also be applied to other pets, and this will not be further described herein.

According to the above description, the present disclosure discloses a pet companion device, a handheld device, a terminal device and a system, wherein the pet companion device comprises a pet companion handheld module and a pet companion terminal module; the pet companion terminal module is arranged on the neck of the pet and is configured to receive first positioning information sent by the pet companion handheld module and return first positioning response information, the first positioning response information comprises the first position of the pet companion terminal module; the pet companion handheld module is arranged in a mobile device and is configured to directionally send out sound information and/or image information according to the first positioning response information of the pet companion terminal module to attract the attention of the pet and urge the pet to exercise. With the solution of the present disclosure, users can control and guide their pets to exercise and play simply by controlling the terminal in their hands without running back and forth or doing other high-intensity sports or using other large-scale equipment, thereby improving the exercise training effect of pets.

What is claimed is:

1. A pet companion handheld device, being characterized in that, comprising:
   a first bottom shell;
   a first face shell, being buckled with the first bottom shell to form a first accommodating cavity;
   a first control circuit board, being arranged in the first accommodating cavity;

a light and shadow output device, being arranged in the first accommodating cavity and electrically connected with the first control circuit board, and being configured to output light and shadow or light spots that attract the attention of the pet;

a plurality of keys, being respectively arranged on the first bottom shell and/or the first face shell and electrically connected with the first control circuit board, and being configured to control the first control circuit board to generate required control signals;

a first graphic display module, and the first graphic display module comprises:

a lamp strip, being accommodated in the first accommodating cavity and electrically connected with the first control circuit board;

a light shielding plate, being covered on the lamp strip;

a sticker, being arranged between the light shielding plate and the first face shell;

the first face shell is opened with a first through hole at a position corresponding to the sticker, the size and shape of the first through hole correspond to the sticker, a first groove is arranged around the first through hole, and a first lens capable of transmitting light is accommodated in the first groove.

2. The pet companion handheld device according to claim 1, being characterized in that, the light and shadow output device comprises a laser, the laser is configured to produce infrared light.

3. The pet companion handheld device according to claim 1, being characterized in that, the pet companion handheld device further comprises a vibration gear adjusting assembly, and the vibration gear adjusting assembly comprises:

a knob plate, being accommodated in the first accommodating cavity and electrically connected with the first control circuit board;

an encoder, being accommodated in the first accommodating cavity, one end of the encoder being electrically connected with the knob plate, and the other end extending out of the first accommodating cavity;

a knob cap, being covered on the end of the encoder extending out of the first accommodating cavity.

4. The pet companion handheld device according to claim 1, being characterized in that, the pet companion handheld device further comprises a first battery and a first charging interface, wherein the first battery is accommodated in the first accommodating cavity and electrically connected with the first control circuit board, the first charging interface is electrically connected with the first control circuit board, and a first charging through hole corresponding to the first charging interface is opened on the first bottom shell.

5. The pet companion handheld device according to claim 1, being characterized in that, the first control circuit board comprises a singlechip, a charging module, a display module and a first wireless communication module;

the singlechip is electrically connected with the charging module, the display module and the first wireless communication module respectively;

the charging module is configured to charge the first battery;

the display module is configured to control the display content of the first graphic display module; and the first wireless communication module is configured to perform wireless communication with an external terminal device.

6. The pet companion handheld device according to claim 5, being characterized in that, the keys include a light and shadow control key that is connected with a light and shadow control input pin of the singlechip, and a light and shadow control output pin of the singlechip is connected with the light and shadow output device to control the light and shadow output device to emit light and shadow.

7. The pet companion handheld device according to claim 5, being characterized in that, the key comprises a sound control key, the sound control key is connected with a buzzer control pin of the singlechip and is configured to input a sound control signal to the external terminal device through the first wireless communication module to control the external terminal device to emit a sound.

8. The pet companion handheld device according to claim 5, being characterized in that, the key comprises a vibration control key, the vibration control key is connected with a motor control pin of the singlechip and is configured to input a vibration control signal to the external terminal device through the first wireless communication module to control the external terminal device to generate vibration.

* * * * *